United States Patent
Wood, Jr. et al.

(10) Patent No.: US 6,896,070 B2
(45) Date of Patent: May 24, 2005

(54) QUICK COUPLER ASSEMBLY WITH DUAL HOOK MEMBERS

(75) Inventors: Robert Lee Wood, Jr., Waterloo, IA (US); Peter Paul Johnston, St. Ionia, IA (US); Duane William Powell, La Porte City, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/621,920

(22) Filed: Jul. 17, 2003

(65) Prior Publication Data

US 2005/0012305 A1 Jan. 20, 2005

(51) Int. Cl.$^7$ .............................................. A01B 59/043
(52) U.S. Cl. ...................................... 172/439; 172/272
(58) Field of Search ................................ 172/272, 273, 172/439, 446–449, 443; 414/703, 722, 723, 912, 920; 280/416.2, 511–513

(56) References Cited

U.S. PATENT DOCUMENTS

| | | | |
|---|---|---|---|
| 3,151,883 A | 10/1964 | Stuart .......................... | 280/415 |
| 3,231,294 A | 1/1966 | Horney ........................ | 280/415 |
| 3,561,788 A | 2/1971 | Carlson et al. ............. | 280/461 |
| 3,572,760 A | 3/1971 | Jones .......................... | 280/461 |
| 3,795,415 A * | 3/1974 | Koch et al. .................. | 172/677 |
| 4,019,753 A * | 4/1977 | Kestel ......................... | 172/448 |
| 4,568,098 A * | 2/1986 | Landry, Jr. ................ | 280/416.1 |
| 5,026,247 A * | 6/1991 | Zimmerman ................ | 414/703 |
| 5,029,650 A * | 7/1991 | Smit ............................. | 172/5 |
| 5,230,295 A * | 7/1993 | Shell ........................... | 114/218 |
| 6,349,959 B2 * | 2/2002 | Schlegel et al. ............ | 280/477 |
| 6,352,124 B1 | 3/2002 | Sancho ....................... | 172/439 |

OTHER PUBLICATIONS

ASAE Standards; Attachment of Implements to Agricultural Wheel Tractors Equipped With Quick–Attaching Coupler; 1999; 2 pages.

* cited by examiner

*Primary Examiner*—Robert E Pezzuto

(57) ABSTRACT

A coupling mechanism for a work vehicle includes a coupler frame for mounting to the work vehicle and a pair of dual hook members mountable on the frame. Each dual hook member has a body with first and second hooks projecting from opposite ends the body. The ends of the body define a body plane extending therebetween. The first and second hooks project on the same side of the body plane. Each hook forms a coupling recess, and each of the recesses opens away from the body plane. The first hook is smaller than the second hook. The dual hook member is mountable in a first orientation wherein the first hook is in an operative position and is mountable in a second orientation wherein the second hook is in an operative position.

15 Claims, 5 Drawing Sheets

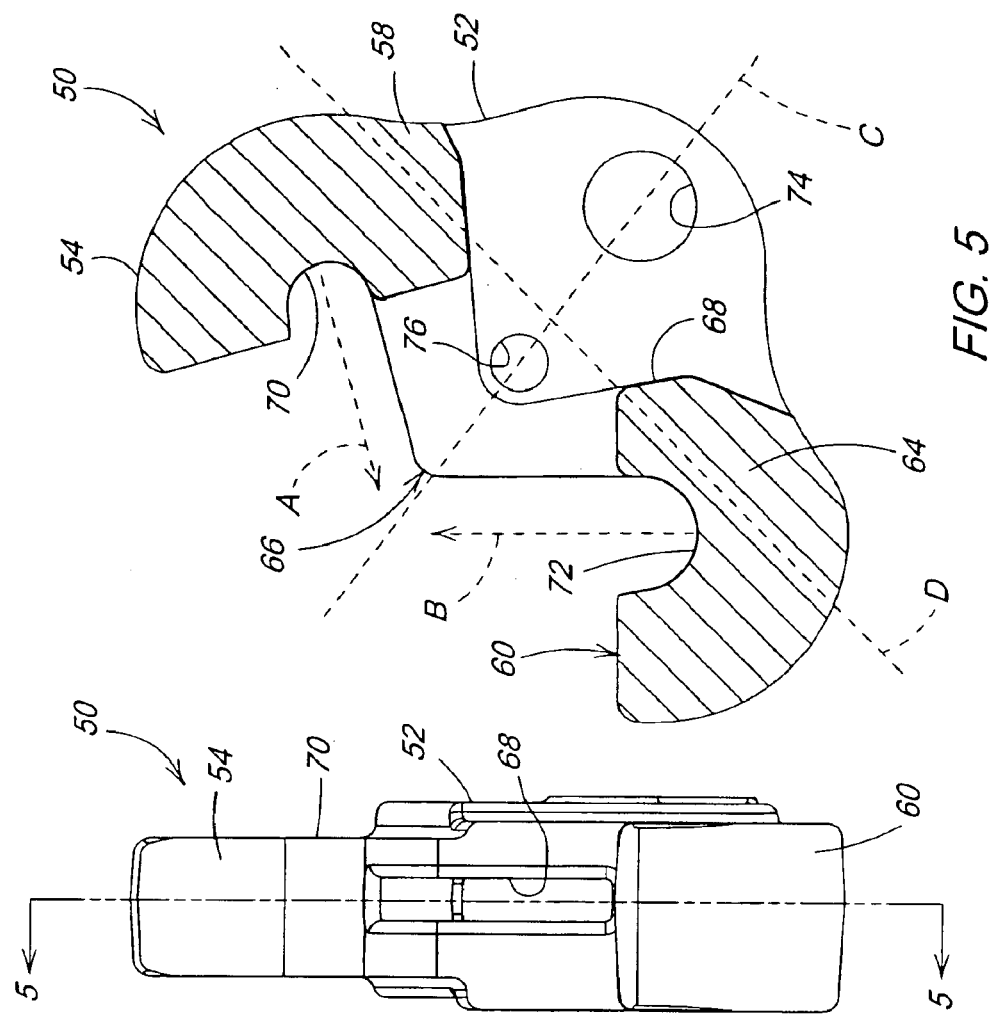
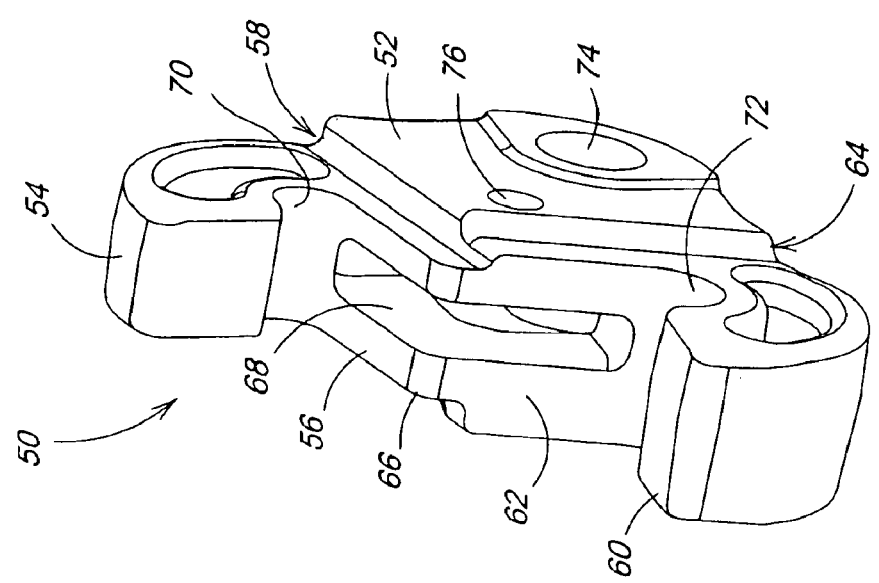
FIG. 5
FIG. 4
FIG. 3

QUICK COUPLER ASSEMBLY WITH DUAL HOOK MEMBERS

BACKGROUND

The present invention relates to a quick coupler for attaching an implement to a vehicle such as an agricultural tractor.

Different sized tractors are normally provided with different sized implement hitches. For example, standards require that larger tractors be provided with a larger category 4N hitch, whereas smaller tractors are normally provided with a smaller category 3 hitch. It is also known to mount a quick coupler to a tractor hitch and then couple an implement to the quick coupler. A larger category 4 quick coupler is normally mounted on a larger category 4 hitch. Yet, there are many hitch-coupled implements which are designed to be coupled with a category 3 hitch. Therefore, it would be desirable to have a quick coupler which can be mounted on a category 4 hitch and which can be modified or adapted to be coupled to either a category 3 or category 4N implement.

SUMMARY

Accordingly, an object of this invention is to provide an adjustable quick coupler mechanism.

A further object is to provide a quick coupler which can be converted to different standard dimensions.

These and other objects are achieved by the present invention, wherein a quick coupler mechanism includes a coupler frame for mounting to a work vehicle and a pair of dual hook members mountable on the frame. Each dual hook member has a body with first and second hooks projecting from opposite ends of the body. The ends of the body define a body plane extending therebetween. The first and second hooks project on the same side of the body plane. Each of the hooks forms a coupling recess, and each of the recesses opens away from the body plane. The first hook is smaller than the second hook. The dual hook member is mountable in a first orientation wherein the first hook is in an operative position and is mountable in a second orientation wherein the second hook is in an operative position. Different upper center hooks may be mounted on the frame to achieve different vertical spacings between center hook and the hooks of the dual hook members.

BRIEF DESCRIPTION OF THE DRAWINGS

FIG. 3 is a perspective view of the attaching member of FIGS. 1 and 2;

FIG. 4 is an end view of the attaching member of FIGS. 1 and 2;

FIG. 5 is a sectional view along lines 5—5 of FIG. 4;

DETAILED DESCRIPTION

Figure 1:
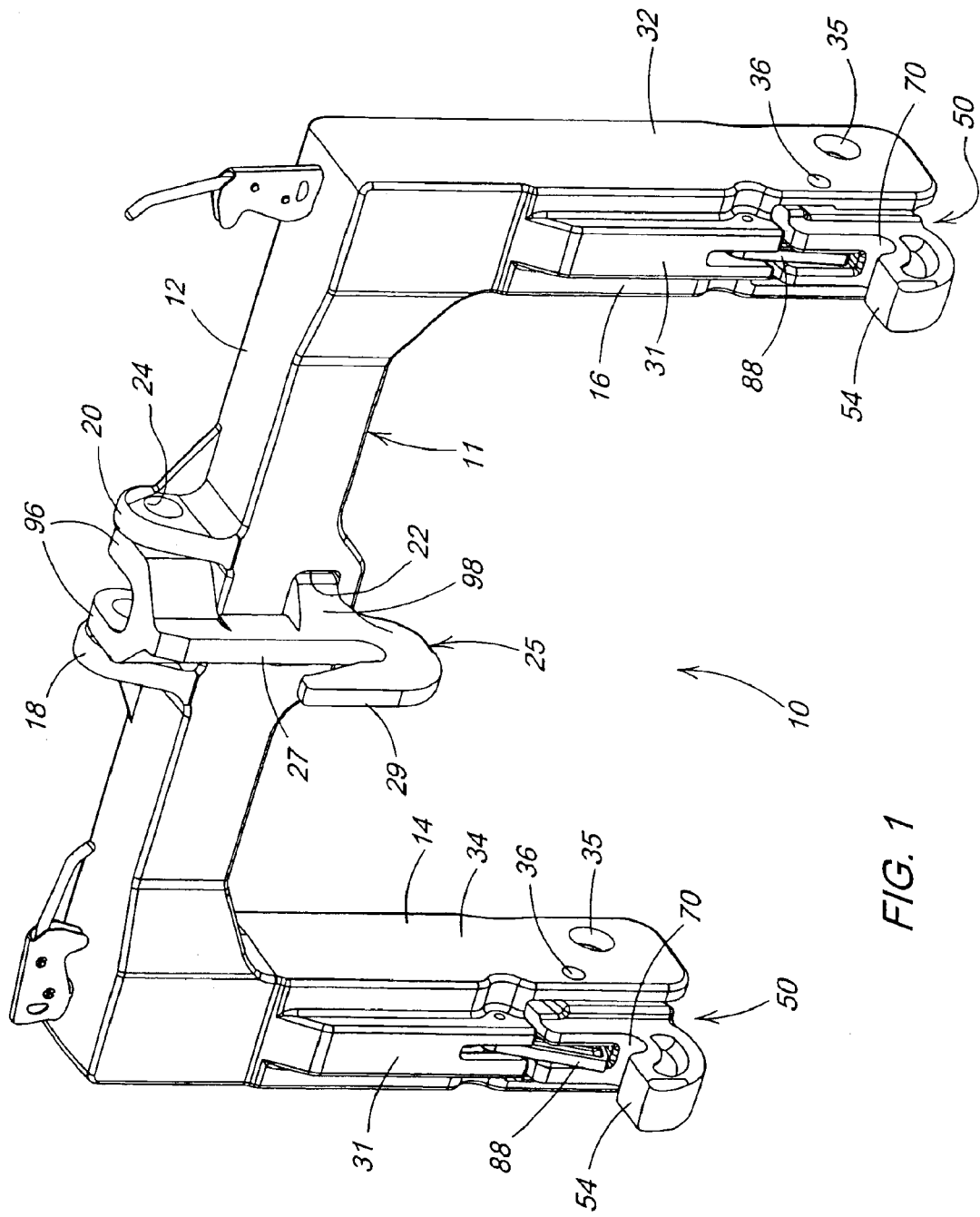
FIG. 1 is a perspective view of a quick coupler assembly according to the present invention with an attaching member in a first orientation.
Figure 2:
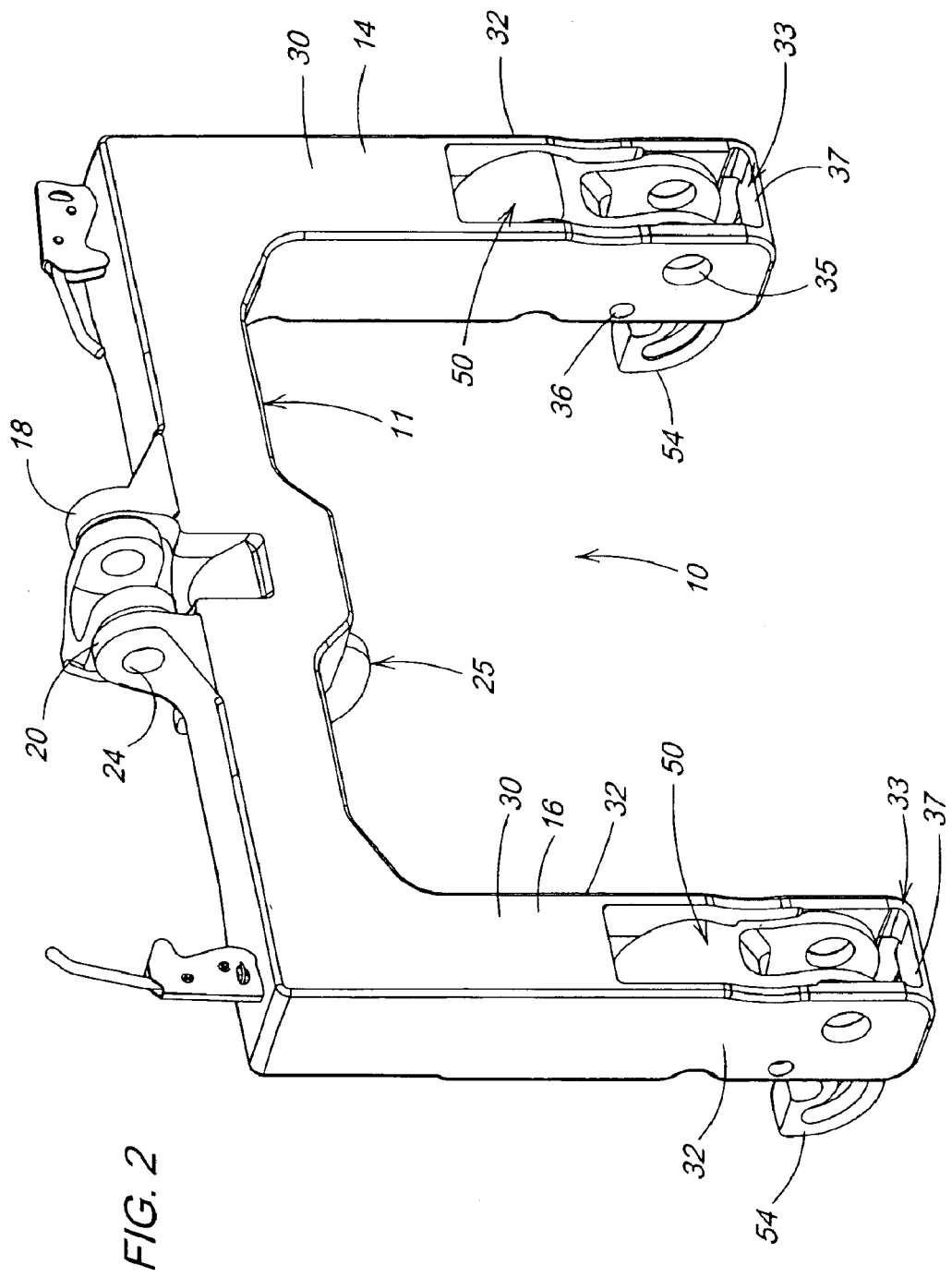
FIG. 2 is another perspective view of the quick coupler assembly of FIG. 1.

Referring to FIGS. 1 and 2, a quick coupler assembly 10 includes a quick coupler frame 11 having an upper cross member 12 and right and left downward extending side members 14 and 16. A pair of upper mounting tabs 18 and 20 are spaced apart and project upwardly from a top surface of cross member 12. A mounting opening 22 extends into cross member 12 below tabs 18 and 20. A bore 24 extends through tabs 18 and 20 for use in coupling the frame 11 to a center hitch link of a tractor (not shown). An upper or center hook 25 is mounted to a central portion of cross member 12.

Each right and left side member 14 and 16 includes a front wall or plate 30, rear wall plate 31, an outer side wall or plate 32 and an inner side wall or plate 34. These form a slot 33 which extends upwardly from the lower end of plates 32 and 34. A bottom plate 37 connects the lower ends of plates 32 and 34. Front plate 30 is shorter than rear plate 31 so that slot 33 has a longer forward opening and a shorter rearward opening. Diagonally spaced-apart bores 35 and 36 extend through plates 32 and 34. Bore 35 is larger and is spaced forward and below smaller bore 36. Since the assembly is symmetrical about a central plane, it follows that the left side member 16 is substantially a mirror image of right side member 14.

Identical dual hook attaching members 50 are removably mounted in the slots 33 of each side member 14,16. Referring now to FIGS. 3, 4 and 5, each attaching member 50 includes a substantially four-sided body 52 which is bisected by a fore-and-aft extending vertical central plane, and a first hook 54 projecting upwardly from a first side 56 of the body 52 and adjacent to a first end or corner 58 of the body 52. A second hook 60 projects rearwardly from a second side 62 of the body 52 and is adjacent to a second end or corner 64 of the body 52. The second hook 60 projects from the body 52 in a direction which is generally perpendicularly with respect to the first hook 54. Both hooks 54 and 62 project parallel to the central plane of the body 52. The sides 56 and 62 are adjacent to each other and are joined at a third common corner 66. The body 52 forms a slot 68 which extends through the body 52 from the corner 66 and into both sides 56 and 62 and to the corner opposite corner 66. Weight reducing recesses are formed in the sides of the hooks 54 and 60.

Each hook 54, 60 forms a respective recess 70, 72 which opens generally in a direction towards the common corner 66. The first and second corners 58, 64 are diagonally opposite to each other. The first hook 54 has a width which is smaller than the width of the second hook 60. To reduce weight, cut-outs are formed in the sides of hooks 54 and 60.

A larger diameter main bore 74 extends though the body 52 near to the corner diagonally opposite from corner 66. A smaller diameter orienting bore 76 extends through the body 52 adjacent to corner 66.

As best seen in FIG. 5, the hooks 54 and 60 are on opposite sides of a central plane C. Recess 70 defines recess opening axis A and recess 72 defines recess opening axis B. Both axes A and B intersect with the central plane C and with each other. Axes A and B preferably intersect each other at an angle of at least 90 degrees. The first and second hooks 54 and 70 project from opposite ends 58, 64, respectively, of the body. The ends 58, 64 define a body plane D extending therebetween. Hooks 54 and 60 project on a same side of the body plane D, and the recesses 70 and 72 both open in a direction facing away from plane D.

Figure 6:
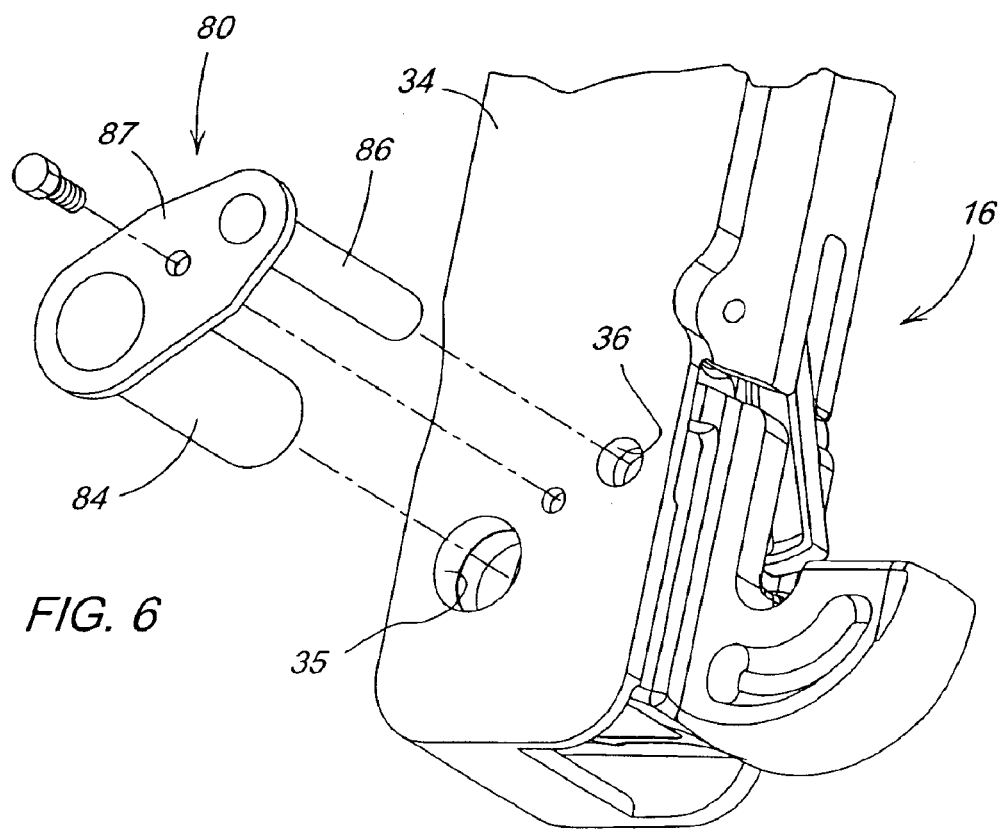
FIG. 6 is a detailed, partially exploded perspective view of a portion of the quick coupler assembly.
Figure 7:
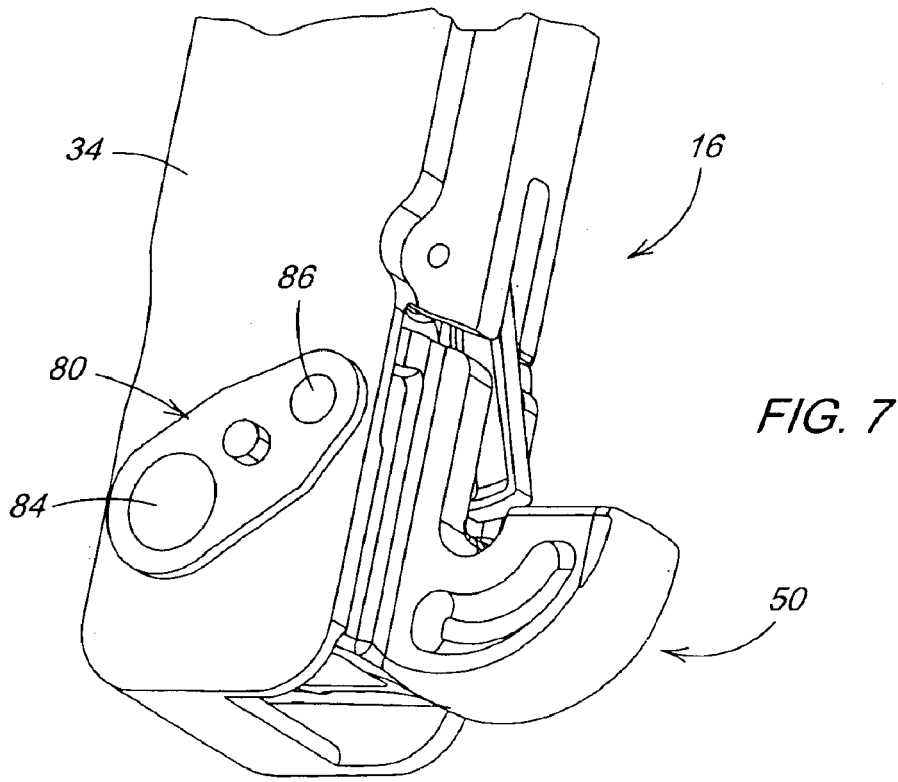
FIG. 7 is detailed, non-exploded perspective view of a portion of the quick coupler assembly.

As best seen in FIG. 6, a pin assembly 80 includes a base 82, a larger diameter main pin 84 and a smaller diameter orienting pin 86. As best seen in FIG. 7, pin assembly 80 may be installed so that pin 84 is received by bores 35 and 74 and so that pin 86 is received by bores 36 and 76. Main pin 84 is able to transmit implement forces from attaching members 50 to the quick coupler frame 11 while pin 86 operates to maintain the attaching members 50 in a proper orientation within the slots 33 in the side members 14 and 16.

Referring again to FIG. 1, each attaching member 50 is selectively mountable in the side members 14, 16 in a first orientation with the smaller first hook 54 in an operative position so that a latch member 88 may hold a coupling member (not shown) in the recesses 70. The upper or center hook 25 has a longer shank 27 to place the hook 29 in proper position relative to the hooks 54. The result is a quick coupler assembly which is suitable for connecting to a smaller implement, such as a category 3 implement.

Figure 8:
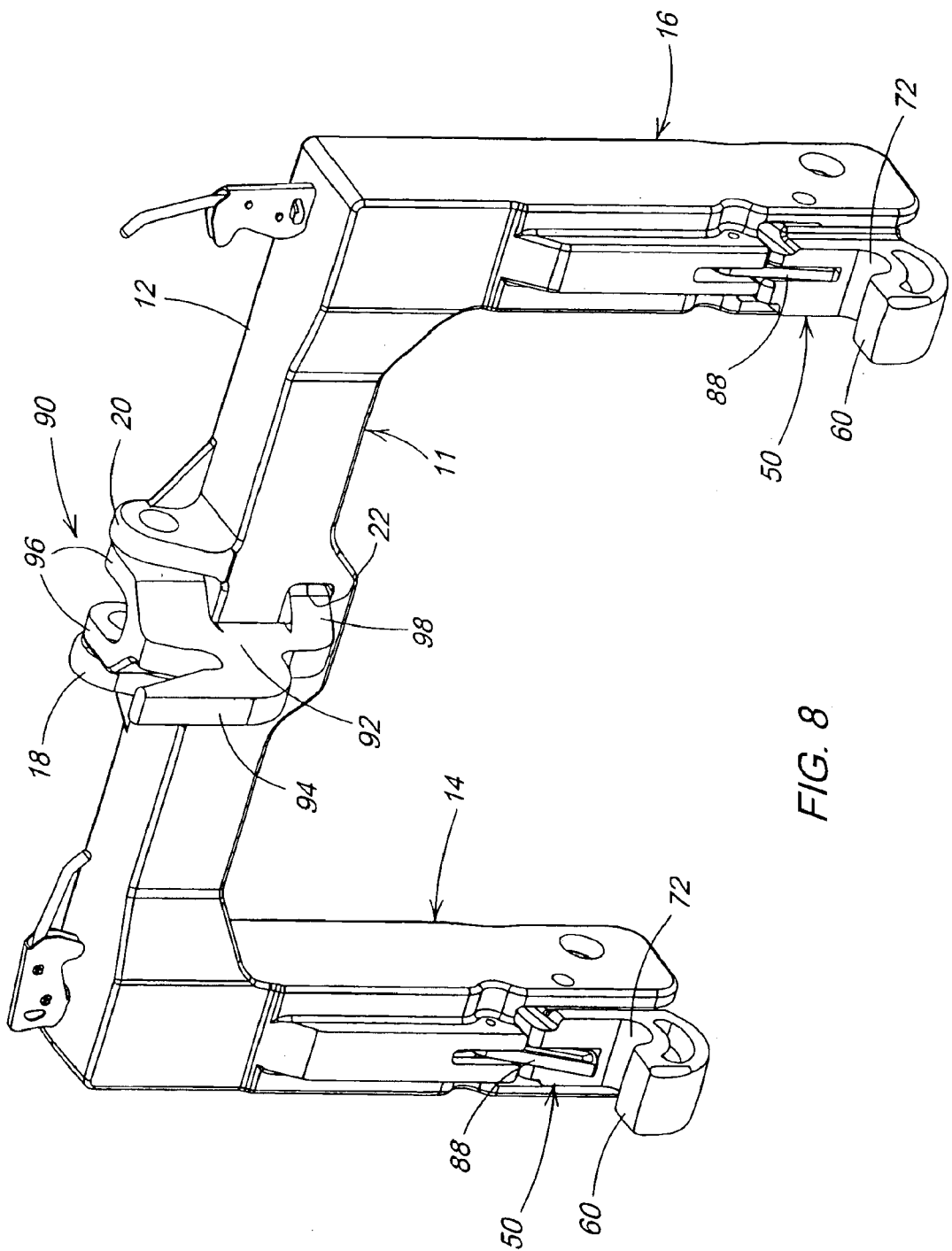
FIG. 8 is a perspective view of the quick coupler assembly with the attaching member in a second orientation.

Referring now to FIG. 8, each attaching member 50 is also selectively mountable in the side members 14, 16 in a second orientation with the larger second hook 60 in an operative position so that a latch member 88 may hold a coupling member (not shown) in the recesses 72. The upper or center hook 90 has a shorter shank 92 to place the hook 94 in proper position relative to the hooks 60. Both center hooks 25, 90 have a pair of upper ears 96 which are received between tabs 18 and 20, and a lower plate 98 which is slidably received in slot 22. The result is a quick coupler assembly which is suitable for connecting to a large implement, such as a category 4 implement.

The quick coupler assembly 10 can be quickly converted from one condition to the other by removing pins, flipping the attaching members 50 about a fore-and-aft axis and reinstalling them into the side members 14, 16.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A coupling mechanism for a work vehicle, the coupling mechanism comprising:
   a frame for mounting to the work vehicle, the frame having a cross member and left and right side members depending from opposite ends of the cross member; and
   an attaching member mountable in each side member, each attaching member comprising a body, a first hook projecting upwardly from the body, and a second hook projecting rearwardly from the body and generally perpendicularly with respect to the first hook, the first hook having at least one dimensional feature which is smaller than a corresponding dimensional feature of the second hook, the attaching member being mountable in a first orientation wherein the first hook is in an operative position and being mountable in a second orientation wherein the second hook is in an operative position.

2. The coupling mechanism of claim 1, wherein:
   each hook forms a recess which opens generally in a direction towards a portion of the body which is located between the hooks.

3. The coupling mechanism of claim 1, wherein:
   the first hook projects from a first side of the body and adjacent to a first corner of the body, and the second hook projects from a second side of the body and adjacent to a second corner of the body, the first and second sides being adjacent to each other and joined at a third common corner.

4. The coupling mechanism of claim 3, wherein:
   the first and second corners are opposite to each other.

5. The coupling mechanism of claim 1, wherein:
   a main bore extends through each attaching member and the respective side member, and a main coupling pin extends through the main bore and through the attaching member and the respective side member.

6. The coupling mechanism of claim 5, wherein:
   an orienting bore extends through each attaching member and the respective side member, and an orienting pin extends through the orienting bore and through the attaching member and the respective side member, the orienting bore being spaced apart from the main bore, the orienting pin engaging the side member and the attaching member to prevent rotation of the attaching member.

7. The coupling mechanism of claim 1, wherein:
   a main bore extends through each attaching member and the respective side member;
   a main coupling pin extends through the main bore and through the attaching member and the respective side member;
   an orienting bore extends through each attaching member and the respective side member, the orienting bore being spaced apart from the main bore; and
   an orienting pin extends through the orienting bore and through the attaching member and the respective side member, the orienting pin engaging the side member and the attaching member to prevent rotation of the attaching member.

8. The coupling mechanism of claim 7, wherein:
   the main coupling pin and the orienting pin are fixed to a mounting plate, and the mounting plate is removably attachable to the side member.

9. The coupling mechanism of claim 1, wherein:
   the first hook has a width which is smaller than a corresponding width of the second hook.

10. A coupling mechanism for a work vehicle, the coupling mechanism comprising:
    a coupler frame for mounting to the work vehicle; and
    a pair of dual hook members mountable on the frame, each dual hook member comprising a body, a first hook projecting upwardly from the body, and a second hook projecting rearwardly from the body, the first hook having at least one dimensional feature which is smaller than a corresponding dimensional feature of the second hook, each dual hook member being mountable in a first orientation wherein the first hook is in an operative position and being mountable in a second orientation wherein the second hook is in an operative position.

11. A coupling mechanism for a work vehicle, the coupling mechanism comprising:
    a coupler frame for mounting to the work vehicle; and
    a pair of dual hook members mountable on the frame, each dual hook member comprising a body with first and second hooks projecting from the body, the body defining a central plane which is positioned between the first and second hooks, each of the hooks forming a coupling recess, each recess defining a recess opening axis, each said axis intersecting with said central plane and the other axis.

12. The coupling mechanism of claim 11, wherein:
the recess opening axes intersect each other at an angle equal to or greater than 90 degrees.

13. A coupling mechanism for a work vehicle, the coupling mechanism comprising:
a coupler frame for mounting to the work vehicle; and
a pair of dual hook members mountable on the frame, each dual hook member comprising a body bisected by vertical fore-and-aft extending central plane and first and second hooks projecting from opposite ends of the body, and the first and second hooks projecting parallel to said central plane.

14. The coupling mechanism of claim 13, wherein:
each of the hooks forming a coupling recess, each of the recesses opening away from the body plane.

15. A coupling mechanism for a work vehicle, the coupling mechanism comprising:
a frame for mounting to the work vehicle, the frame having a cross member and left and right side members depending from opposite ends of the cross member, each side member having inner and outer side walls forming a slot therebetween; and an attaching member mountable in each side member, each attaching member comprising a body, a first hook projecting from the body, and a second hook projecting from the body and generally perpendicularly with respect to the first hook, the first hook having at least one dimensional feature which is smaller than a corresponding dimensional feature of the second hook, the attaching member being mountable in a first orientation wherein the first hook is in an operative position and the second hook is received by said slot, and being mountable in a second orientation wherein the second hook is in an operative position and the first hook is received by the slot.

\* \* \* \* \*